Sept. 18, 1951     H. O. FOLKINS ET AL     2,568,121
PREPARATION OF CARBON DISULFIDE
Filed March 18, 1948     3 Sheets-Sheet 1
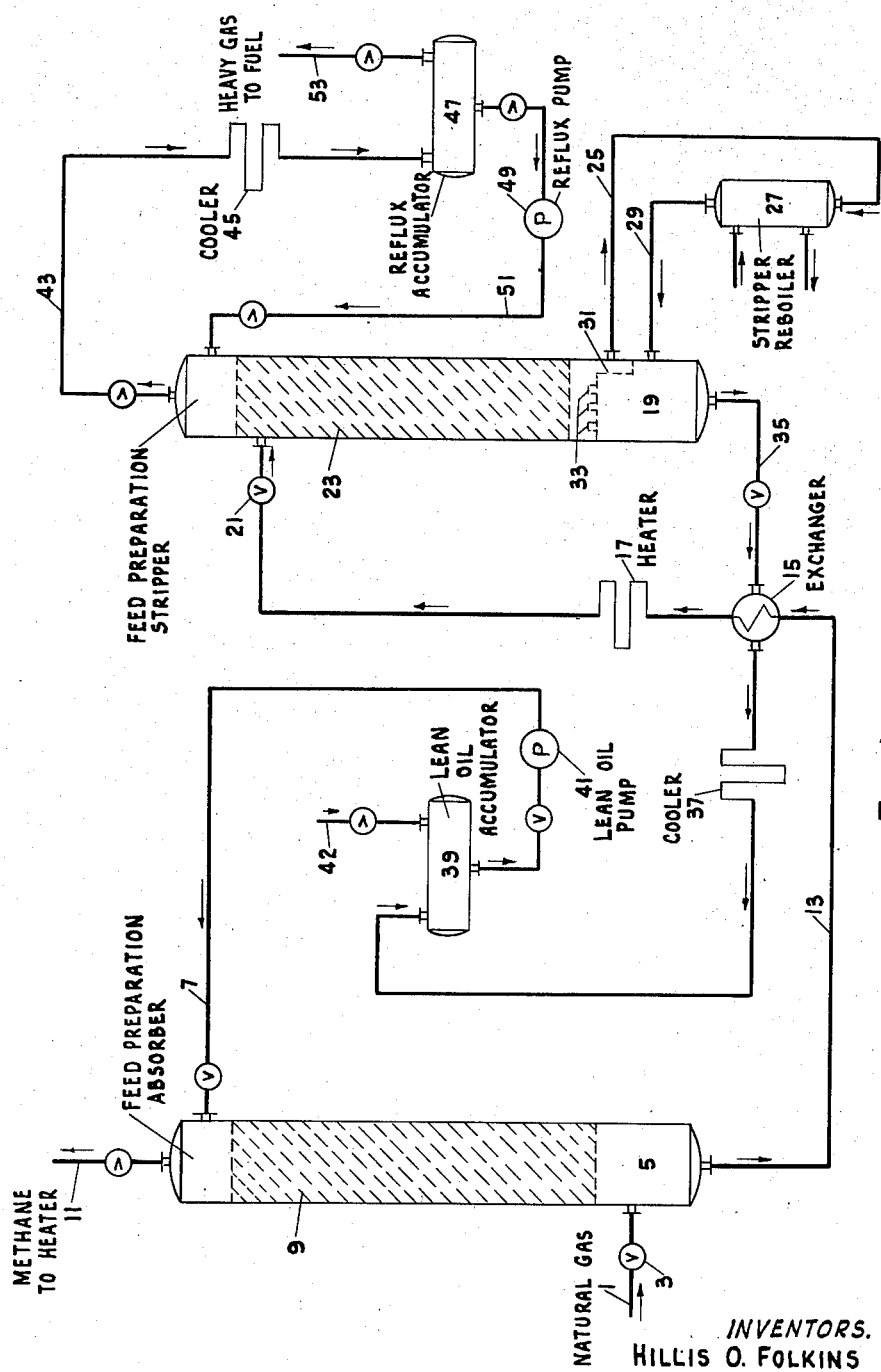
INVENTORS.
HILLIS O. FOLKINS
CHARLES A. PORTER
BY ELMER MILLER
HARVEY HENNIG
Edward H. Lang

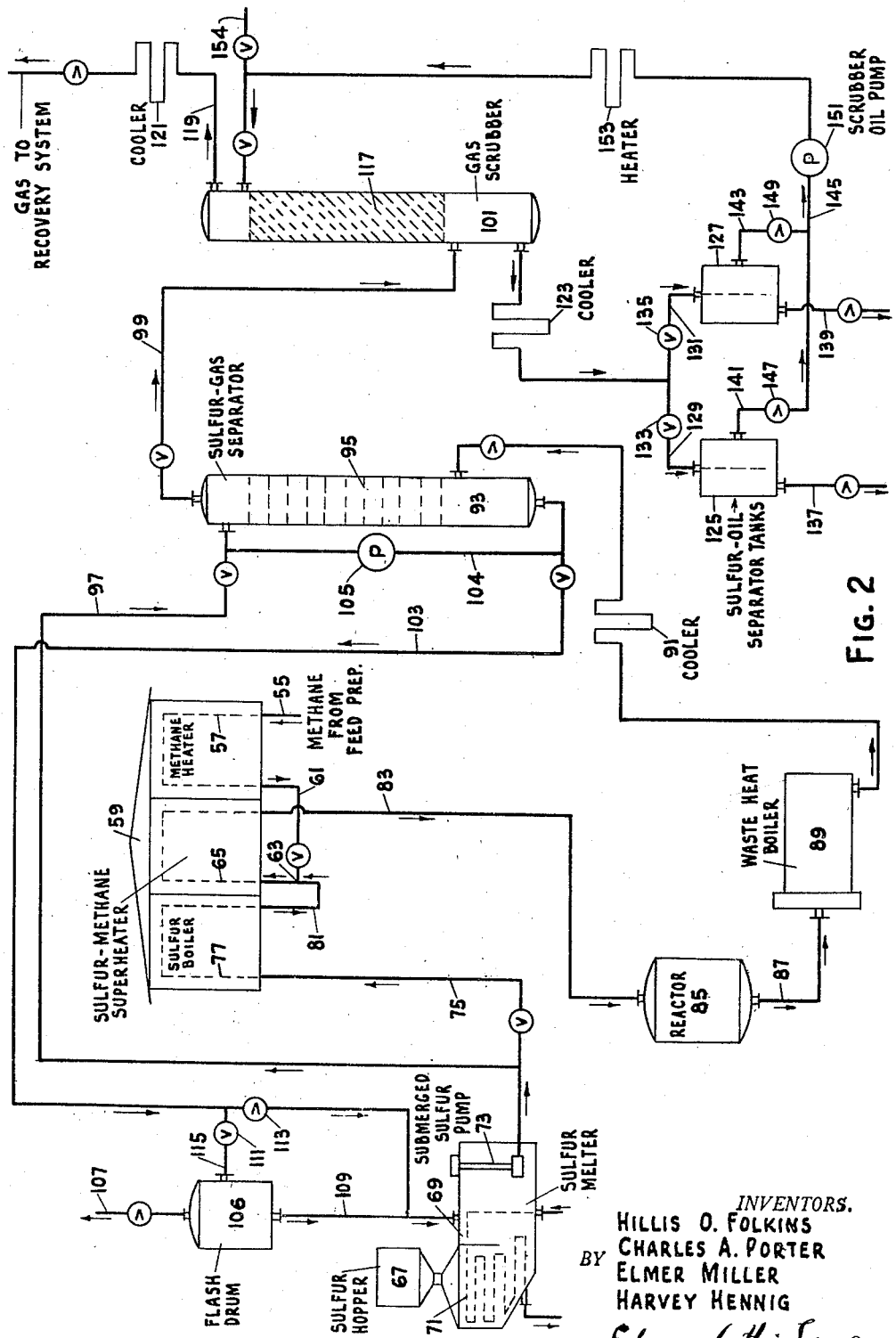

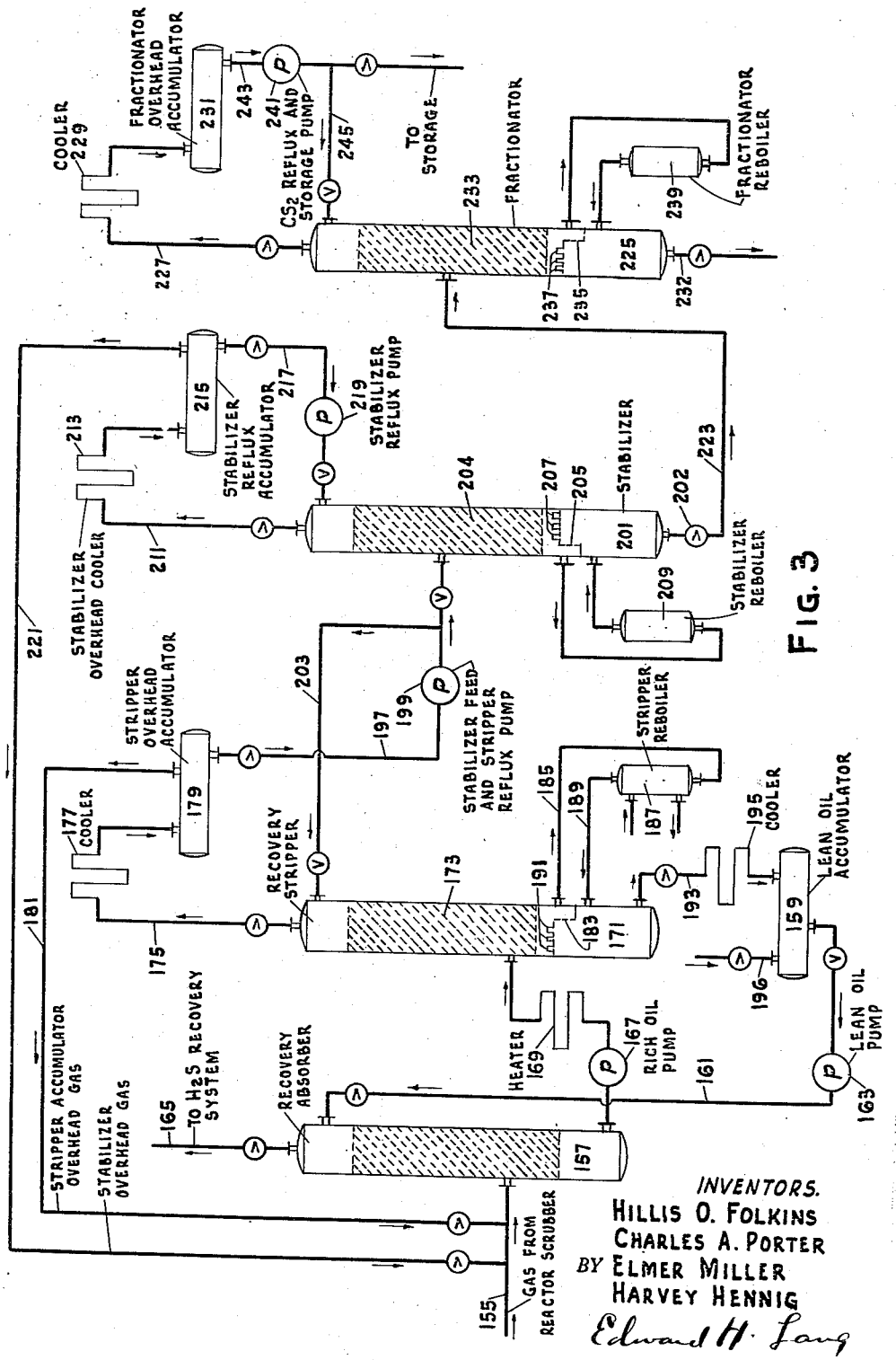

Patented Sept. 18, 1951

2,568,121

UNITED STATES PATENT OFFICE 2,568,121

PREPARATION OF CARBON DISULFIDE

Hillis O. Folkins, Skokie, Charles A. Porter, Crystal Lake, and Elmer Miller and Harvey Hennig, Evanston, Ill., assignors to The Pure Oil Company, Chicago, Ill., a corporation of Ohio Application March 18, 1948, Serial No. 15,664

5 Claims. (Cl. 23—206)

This invention relates to method and apparatus for synthesizing carbon disulfide from hydrocarbon gas and sulfur.

An object of the invention is to provide a novel method and apparatus for superheating sulfur vapors prior to charging them to a catalytic reaction zone.

Another object of the invention is to provide method and apparatus for conducting the synthesis of carbon disulfide from sulfur vapor and hydrocarbon gas under adiabatic conditions.

Still another object of the invention is to provide method and apparatus for separating finely divided sulfur particles and sulfur vapor from the reaction products of a carbon disulfide operation.

Other objects of the invention will manifest themselves from the following description and the accompanying drawing of which Figure 1 is a diagrammatic elevational view of the feed preparation section of apparatus useful for carrying out the process of this invention;

Figure 2 is a diagrammatic elevational view of the heater, reactor and sulfur recovery section of apparatus useful in carrying out the invention; and Figure 3 is a diagrammatic elevational view of the product recovery section of the apparatus.

Referring now to Figure 1, the numeral 1 indicates a line controlled by valve 3 for charging gas to the process. The gas charged under pressure through line 1 may be natural gas or refinery gas or manufactured gas, preferably having a high content of methane. The charging gas passes to the lower portion of an absorber 5 and passes upwardly therethrough in contact with a countercurrent stream of lean absorber oil such as light gas oil, kerosene or naphtha. The absorber 5 may be filled between the gas inlet 1 and the lean absorber oil inlet pipe 7 with contacting surfaces 9 such as Raschig rings. It will be understood that any other vapor-liquid contacting devices, such as bubble plates, may be used instead of Raschig rings. The absorber is preferably maintained under pressure of approximately 50 to 125 pounds per square inch gauge. In the absorber 5 the major portion of those hydrocarbons having three (3) or more carbon atoms in the molecule are absorbed so that the gas leaving the top of the absorber through line 11 contains 1% or less of $C_4$ and higher molecular weight hydrocarbons, 96% or more of $C_1$ and $C_2$ hydrocarbons, the total $C_2$ hydrocarbon content of the gas being not more than about 10% and the $C_3$ hydrocarbon content being not over 4%.

The fat absorber oil leaves the bottom of the absorber through line 13, passes through an indirect heat exchanger 15, an indirect steam heater 17, and then is sent to the upper portion of stripper 19. In passing through heat exchanger 15 and heater 17, the fat oil is heated to a temperature in the range of approximately 200°–350° F., dependent upon operating conditions and type of absorption oil used, in order to strip the absorbed gas from the absorption oil. Pressure in the line 13 may be reduced at valve 21 to approximately atmospheric pressure. The fat oil passes downwardly through stripper 19 over contacting surfaces 23, such as Raschig rings or bubble plates, and leaves the lower portion of the stripper through line 25, passes through the stripper reboiler 27 wherein it is indirectly heated by steam and thence back to the lower portion of tower 19 through line 29 immediately below the plate 31. The plate 31 has vapor uptakes 33 but does not permit liquid to flow from the section of the stripper above the plate into the section below the plate. Lean oil is withdrawn from the bottom of the stripper through line 35, passed in indirect heat exchange with fat oil in the exchanger 15, cooled to a temperature of 100° F. or less in water cooler 37 and returned to the lean oil accumulator 39. From the accumulator 39 the lean absorption oil is pumped by means of pump 41 through line 7 back to the top of the absorber. Fresh absorber oil is charged to accumulator 39 as required through line 42.

Gases stripped from the absorber oil leave the top of the stripper 19 through line 43, pass through water cooler 45 wherein the heavier constituents of the gas are condensed to a liquid and collected in reflux accumulator 47. The liquefied gas is recycled by means of pump 49 through line 51 to the top of stripper 19 as reflux. Uncondensed gas is withdrawn from the accumulator 47 through line 53 and may be used for any desired purpose, such as fuel, gasoline blending stock or charging stock for a gas polymerization or polyforming operation.

The gas, stripped of a large portion of its high molecular weight constituents, leaving the top of the absorber 5 through line 11 is charged through line 55 (Figure 2) to a methane heater 57 located in furnace 59. The methane heater may be a heating coil of sufficient length to heat the gas to a temperature of approximately 900° to 1200° F., but preferably about 1000°–1100° F. In some cases it may be advantageous to heat the gas to temperatures of the order of 1500° F. or above as a means of supplying heat to the sulfur vapor in the gas-sulfur vapor superheater. In most cases, however, it is advantageous to keep the gas below its threshold cracking temperature under the conditions employed. From the outlet of the methane heater, the preheated gas passes through line 61 and joins sulfur vapor at the point 63, and the combined gas-sulfur vapor stream passes through the sulfur-gas superheater 65 wherein the mixed stream is heated to a reaction temperature of approximately 950°–1300° F., but preferably about 1100°–1175° F.

Instead of mixing the methane with sulfur at the outlet of the sulfur boiler, methane may be introduced into the sulfur stream at the sulfur boiler inlet and the sulfur vaporized in the presence of methane. When introducing methane into the sulfur boiler inlet, it is preferred to preheat the methane to a temperature sufficient to prevent cooling of the sulfur.

Solid sulfur, preferably in powdered form is fed from hopper 67 into sulfur melter 69. The sulfur melter is heated by means of a steam coil 71 so that the molten sulfur is maintained at a temperature between approximately 250°–300° F., and preferably about 270° F. Care should be exercised not to heat the sulfur in melter 69 to a temperature within the high viscosity sulfur range. The molten sulfur is pumped from the melter 69 by means of submerged centrifugal or other suitable pump 73 through line 75, preferably under a pressure of approximately 50–100 pounds per square inch, to sulfur boiler 77.

The pressure under which the molten sulfur is pumped will depend on the operating pressure maintained in the reactor and on the mechanical design of the unit. The sulfur boiler may be a tube or coil made of alloy or other materials having high resistance to sulfur corrosion, such as, for example, an alloy composed of 16% to 18% chromium, 10% to 14% nickel, 2% to 3% molybdenum, 2% maximum manganese, 0.1% maximum carbon and the balance iron. In the sulfur boiler 77, the sulfur is heated to a temperature sufficient to vaporize it at operating pressures employed, which temperature may be approximately 850°–1200° F., after which the sulfur vapor leaves the sulfur boiler 77 through line 81 and joins the preheated hydrocarbon gas at the point 63 before passing to the superheater 65. The superheater 65 will also be constructed of sulfur resistant alloy similar to that used in sulfur boiler 77.

The mixing of the sulfur and hydrocarbon vapor before superheating is important for the reason that loss of heat in the gas undergoing reaction is reduced. Sulfur dissociates at high temperatures with absorption of heat, and the amount of dissociation is dependent upon the partial pressure of the sulfur vapor. If sulfur were superheated separately and then mixed with the superheated gas, the partial pressure of the sulfur would be lowered upon mixture with the gas, with the result that further dissociation and absorption of heat would occur after the sulfur left the superheater with consequent lowering of temperature of the reaction mixture below desired reaction temperature. Therefore, by mixing the sulfur vapor and gas before superheating, further dissociation of sulfur vapor occurs in the superheating zone and loss of temperature due to dissociation after superheating and consequent reduction in conversion rate are avoided.

The superheated gas-sulfur stream leaves the superheater 65 through line 83 and passes to the upper portion of reactor 85. Reactor 85 may take the form of a tube or drum. Where iso-thermal operation is used, the reactor 85 is heated sufficiently to maintain the temperature of the reactants and prevent temperature drop through the reactor. Any suitable type of reactor may be used, as, for example, a series of parallel tubes located in a furnace, or a drum containing parallel tubes anchored at both ends in plates so that hot combustion gas may pass around the tubes with the reactants passing through the tubes. A suitable catalytic reactor of this type is shown and disclosed in Patent No. 2,149,300.

Where adiabatic operation of the reactor is conducted, the reactor will be well insulated against heat loss and may be lined with a material such as magnesite capable of resisting corrosion of sulfur and sulfur compounds present in the reactor. The reactor may also be constructed of corrosion resistant alloy similar to that used in the heating tubes. The reactor is filled with a catalyst capable of accelerating the reaction of sulfur and hydrocarbon to carbon disulfide, such as silica gel, activated alumina, catalytic clays, bauxite, natural or synthetic silica-alumina catalytic compositions, particularly synthetic silica-alumina catalysts containing from 2% to 10% by weight of silica, and in general those catalysts disclosed in Thacker Patent 2,330,934.

Where the reactor is operated iso-thermally, the temperature in the reactor will be maintained from 950° to 1300° F., and preferably between 1000°–1150° F. Where adiabatic operation of the reactor is conducted, it is preferred to charge the reactants to the reactor at a temperature sufficiently above the desired reaction temperature so that the average temperature through the reactor will be approximately the desired temperature. For example, if it is desired to operate at a temperature of approximately 1115° F., and at a pressure of from 20–60 pounds per square inch, the reactants may be fed to the top of the reaction chamber at a temperature of approximately 1145° F., since a drop in temperature of approximately 30° to 70° F. occurs through the catalyst bed. When operating adiabatically temperature of approximately 1075 to 1175° F. may be maintained in the catalyst bed. The size of the reactor and hence the amount of catalyst needed is determined by the amount of conversion desired and the conditions of operation employed. For the conditions of operation specified above a space velocity based on hydrocarbon charge only of from 100 to 400 results in good conversion. Space velocity is defined here as the number of cubic feet of gas at 32° F. and 760 mm. Hg passing over unit volume of catalyst per hour. The amount of sulfur charged may vary, but amounts equal to or in excess of that required for stoichiometric reaction with the above volumes of gas are preferred. The preferred pressure maintained in reactor 85 will be approximately 20 to 60 pounds per square inch. The reactor is preferably operated at a pressure sufficient to charge the reaction products through the remainder of the apparatus without the necessity of compressing gases.

Alternatively, the reaction may be carried out at pressures below 20 pounds per square inch. Lower pressures tend to decrease temperature drop across the catalyst bed, especially when operating adiabatically in the lower part of the temperature range. A compressor could be used to attain desired pressures in the carbon disulfide recovery system.

In the reactor 85, the sulfur and hydrocarbons combine to form carbon disulfide and hydrogen sulfide. The proportion of hydrocarbon and sulfur charged to the reactor may vary somewhat, but we prefer to use an amount of sulfur equal to about 10% to 50% by weight in excess of the stoichiometric amount necessary to react with the hydrocarbon to form carbon disulfide and hydrogen sulfide. The use of excess sulfur is beneficial for several reasons. Because of the fact that sulfur dissociates at high temperatures, considerable heat is absorbed by the sulfur in the heating operation. The heat content of this excess sulfur at reactor inlet temperatures is instrumental in reducing temperature drop through the catalyst in the endothermic range of reaction by distribution of heat from the excess sulfur. Conversely, in an exothermic reaction the heat of reaction would be absorbed by the excess sulfur. Moreover, the excess sulfur causes more complete reaction of the hydrocarbon and by keeping the content of hydrocarbon in the tail gas low, the necessity of separating the hydrocarbon from the hydrogen sulfide prior to recovery of sulfur from the hydrogen sulfide is avoided.

The reaction products leave the bottom of the reactor 85 through line 87 and pass through a waste heat boiler 89 where the gases pass in indirect heat exchange with water and/or steam in order to convert the water to high pressure steam for use in the reboilers and for extraneous use if excess steam is available. The total reaction products leave the waste heat boiler 89 at a temperature of approximately 450° to 500° F., pass through water cooler 91 where the temperature of the reaction products is reduced to approximately 250°–300° F., and preferably about 270° F., and the products are then charged to the lower portion of the sulfur-gas separator 93. Instead of using a waste heat boiler and subsequent water cooler for condensing sulfur and cooling products, other arrangements may be used such as finned radiating surfaces and/or conventional water coolers. The sulfur-gas separator 93 may be a tower containing a series of bubble plates 95 to afford contact between the rising gases and the successive bodies of liquid sulfur, supported on the plates. Other contact surfaces, such as Raschig rings, may be substituted for bubble plates 95, and the separator maintained substantially flooded with liquid sulfur. Molten sulfur is charged by pump 73 from melter 69 through line 97 to the separator 93. In the separator 93, the major portion of the sulfur contained in the reaction gases is condensed and absorbed in the liquid sulfur. Carbon disulfide and hydrogen sulfide, together with any unreacted hydrocarbon gas, leave the top of the separator through line 99 and pass to the lower portion of a gas scrubber 101. Molten sulfur is recirculated from the bottom of sulfur-gas separator 93 through line 103 back to sulfur melter 69. Alternatively, liquid sulfur may be circulated from the bottom to the top of separator 93, through the line 104 by means of pump 105. The pressure in sulfur-gas separator 93 is ordinarily sufficient to force the sulfur from the bottom of the tower back to the melter without the necessity of pumping it. It may be desirable to recycle the sulfur from the bottom of separator 93 to a flash drum 106 maintained at atmospheric pressure in order to permit any carbon disulfide which may have been absorbed in the sulfur to flash off and thereby avoid the possibility of the carbon disulfide vapor flashing in the melter and causing fire. Any carbon disulfide flashed off in the drum 106 is withdrawn through line 107 for recovery, or may be exhausted through the air. The molten sulfur is returned from the flash drum 106 to the sulfur melter through line 109. Appropriate valves 111 and 113 are placed in lines 115 and 103, respectively, in order to divert the sulfur stream either to the flash drum 106 or to the sulfur melter 69. In the gas scrubber 101, the reaction products from which the bulk of the sulfur has been removed will pass upwardly countercurrent to a stream of scrubber oil in order to remove any remaining sulfur from the reaction products. As scrubber oil, light gas oil or a lubricating oil fraction may be used. The scrubber 101 is provided with Raschig rings 117, or other suitable contacting surfaces. The temperature in the scrubber will be approximately the same as that in separator 93 and the pressure will be approximately the same as maintained in the reactor. The reaction products denuded of remaining sulfur are withdrawn from the top of gas scrubber 101 through line 119 and after being cooled to a temperature of 100° F. or less by means of cooling water in heat exchanger 121 are passed to the gas recovery system. The scrubber oil leaves the bottom of scrubber 101 through water cooler 123 where the temperature of the oil is reduced to 100° F. or less and passes to settling drums 125 and 127 through lines 129 and 131 controlled by valves 133 and 135. Two settling drums are provided in order that sulfur may be permitted to settle from the oil in one drum and the sulfur and oil (optionally) removed from this drum while oil is being recirculated to and from the other drum. Upon cooling the scrubber oil, the sulfur precipitates out of the oil and is withdrawn as a sludge from the bottom of the settlers through lines 137 and 139. Oil is recirculated from the drums through lines 141, 143 and 145. Lines 141 and 143 are controlled by valves 147 and 149 in order to permit shutting off one line while oil is recirculated from the other drum. The oil is recirculated back to the scrubber 101 by means of pump 151 through heater 153, wherein the oil is indirectly heated by steam to a temperature of approximately 250°–300° F., and preferably about 270° F. Make-up oil may be added through line 154 as required.

In place of the settling drums 125 and 127, filters or centrifuges may be provided to separate and remove sulfur from the oil. The scrubber oil may be recycled indefinitely or the oil may be withdrawn from time to time and burned or used for making high sulfur cutting oils or extreme pressure lubricants. The oil is particularly valuable as a cutting oil because of the high sulfur content thereof made possible by the manner in which the sulfur is incorporated in the oil.

Reaction products after leaving gas scrubber through line 119 and after having been cooled to 100° F. or less in exchanger 121 pass through line 155 (Figure 3) into the lower portion of an absorber 157. The absorber is filled with Raschig rings or other liquid-gas contacting elements. Absorber 157 is preferably maintained at a pressure of approximately 20 to 50 pounds per square inch in order to absorb carbon disulfide from the reaction product gases. Lean oil is pumped into the top of the absorber from accumulator 159 through line 161 by means of pump 163. As absorber oil, heptane or petroleum naphtha having a boiling range of about 200°–400° F. or other fraction boiling above the boiling point of carbon disulfide may be used. Other solvents or absorbing mediums such as benzene and o-dichlorobenzene may be used. It is preferable to choose an absorber oil which has a boiling point or boiling range not too far above the boiling point of carbon disulfide in order to enable the latter to be readily stripped therefrom. However, heavier absorption oils may be used and stripping carried out with the aid of a stripping medium such as steam, methane or other inert gas. The unabsorbed gas leaves the top of the absorber through line 165. This gas is composed principally of hydrogen sulfide with a small amount of hydrocarbon gas and about 0.5% or less of carbon disulfide. This gas may be charged to a hydrogen sulfide recovery system wherein the hydrogen sulfide is converted to sulfur, or the gas may be used in the manufacture of other chemicals such as sodium sulfide, sodium hydrosulfide, zinc sulfide and sulfuric acid. The rich oil is withdrawn from the bottom of absorber 157 by means of pump 167, passed through steam heater 169 where the rich oil is preheated to a suitable temperature, as for example, 200°–325° F. and charged to the middle section of stripper 171. Stripper 171 is provided with Raschig rings 173 or other liquid-gas contact elements. Carbon disulfide is stripped from the absorber oil and passes from the top of the stripper through line 175, water cooler or condenser 177 where the temperature is reduced to 100° F. or less, to accumulator 179. Any gas and/or vapor which remains uncondensed leaves the accumulator 179 through line 181 and is returned to the inlet of the absorber 157 through line 155. The stripper 171 is preferably operated at a pressure slightly above the pressure in the absorber 157, as, for example, 25 to 55 pounds per square inch, in order to avoid the necessity of compressing the gas returned through line 181 to the scrubber.

The absorber oil is withdrawn from the plate 183 in the bottom portion of stripper 171 through line 185 and charged to reboiler 187 and thence returned through line 189 to the section of the stripper below the plate 183. Plate 183 is provided with vapor uptakes 191. Lean absorber oil is withdrawn from the bottom of stripper 171 through line 193, cooled in water cooler 195 to a temperature below 100° F. and returned to accumulator 159. It will be apparent that the rich oil from absorber 157 can be used to partially cool the lean oil from stripper 171 by providing a suitable heat exchanger. Fresh absorber liquid is added to accumulator 159 as required through line 196.

Liquid carbon disulfide is withdrawn from accumulator 179 through line 197 and charged by means of pump 199 to stabilizer 201. A portion of the carbon disulfide is returned through line 203 to the upper portion of stripper 171 as reflux. The stabilizer 201 is operated at pressures of 20 pounds per square inch gauge or above and preferably in the range of 50–150 pounds. The temperature in the bottom of the stabilizer is that needed to effectively boil the carbon disulfide and free it of hydrogen sulfide and hydrocarbon gas under the conditions of operation. The stabilizer 201 is equipped with contact surfaces 204, such as Raschig rings, with a plate 205 having vapor uptakes 207 and a reboiler 209. In the stabilizer 201, any hydrogen sulfide or hydrocarbon gas absorbed in the carbon disulfide is boiled off and passes overhead through line 211 through water cooler 213. A small amount of carbon disulfide passes overhead, condensed in part in cooler 213, and collected in accumulator 215. The condensate from accumulator 215 is returned to the top of the stabilizer through line 217 by means of pump 219. The uncondensed gases and vapors are withdrawn from the accumulator 215 through line 221 and recycled to the inlet of absorber 157 through line 155. The bottoms from the stabilizer 201 are withdrawn through a pressure control valve 202 and charged through line 223 with the necessary heating or cooling, to the middle portion of fractionating column 225 from which the carbon disulfide is taken overhead through line 227, condensed in water cooler 229 and collected in accumulator 231 as finished product. Any bottoms, such as absorption oil, which may have passed overhead with the carbon disulfide from stripper 171 are withdrawn from the bottom of the fractionator 225 through line 232. Fractionator 225 is equipped with contact surfaces 233 such as Raschig rings, a separator plate 235 having vapor uptakes 237 and a reboiler 239. Fractionator 225 is preferably operated at atmospheric or below superatmospheric pressure. The finished carbon disulfide is withdrawn from the accumulator by means of pumps 241 through line 243 to storage. A portion of the carbon disulfide may be recirculated through line 245 as reflux to the top of the fractionator 225.

It will be understood that the process is not limited to the flow described and the apparatus shown in the recovery system. Variations in both flow and equipment can be made to suit particular conditions of operation. For example, when operating under pressure, a portion of the carbon disulfide will condense in cooler 121. It might be expedient, therefore, when operating under pressure to provide an accumulator to which the products leaving cooler 121 could be sent in order to separate the condensed carbon disulfide and then charge it directly to the stabilizer 201.

Likewise, by equipping absorber 157 with a reboiler so that hydrogen sulfide and methane can be completely removed from the liquid, the stabilizer 201 can be dispensed with.

It will be apparent to those skilled in the art that the various pieces of equipment are shown diagrammatically. The invention is not limited to the use of any particular type of equipment. For example, although once-through reboilers have been shown, kettle-type reboilers may be used in place thereof. Moreover, strippers may be used which employ live steam as stripping medium. Such other variants as are within the skill of the art are implicit within the disclosure.

The following examples are given to demonstrate the invention.

*Example 1.*—Natural gas was charged to the gas preparation portion of the system and contacted in the absorber with No. 2 furnace oil. The gas leaving the absorber had a methane content of between 97–98 mol per cent, the balance being principally ethane with less than 1% of propane and higher molecular weight hydrocarbons. The prepared natural gas was charged to the gas heater wherein the gas was heated to a temperature of approximately 1090° F. The gas was charged to the heater at a rate of 142 cu. ft. per hour. Sulfur was charged at a rate of 64.7 pounds per hour to the sulfur boiler and there heated to a temperature of approximately 1050° F. The mol ratio of $S_2$ vapor to gas charged was 2.55. The sulfur vapors and preheated gas were mixed and charged to the superheater wherein the mixture was heated to a temperature of approximately 1120° F. The mixed gas-sulfur stream was maintained in the catalyst bed at an average temperature of approximately 1112° F. The operation was conducted iso-thermally, the reaction chamber being electrically heated sufficiently to maintain the catalyst bed at a desired reaction temperature. The reactor used was an alloy tube approximately 44 inches in length and 6 inches I. D., placed in vertical position. The reactor contained a perforated plate adjacent the bottom thereof, upon which a three-foot bed of catalyst was retained. The catalyst space was filled with 24.8 pounds of 6 mesh silica gel occupying a space of 0.59 cu. ft. The pressure at the superheater outlet and in the reactor was approximately 44 pounds per square inch gauge. The run was conducted for a period of 12 hours during which period the average production of carbon disulfide was 28 pounds per hour. The carbon disulfide recovered was 90% of the theoretical amount based on the gas charged.

*Example 2.*—A second run was conducted in the same apparatus as that used for the run in Example 1, except that the reactor was operated under adiabatic conditions. Only sufficient heat was applied to the outside of the reactor to prevent loss of heat through the reactor wall. In this run the prepared natural gas was preheated to a temperature of 1095° F. and the sulfur vapor was heated to 1050° F. before being mixed with the preheated gas. The mixed stream was superheated to a temperature of 1140° F. at which temperature it left the superheater under pressure of 46 pounds per square inch gauge. The mixed gas-sulfur vapor stream entered the catalyst bed at about 46 pounds per square inch pressure and at a temperature of 1132° F., and left the catalyst bed at a temperature of approximately 1104° F. so that the temperature drop through the bed was approximately 28° F. In this run, the sulfur was charged to the sulfur boiler at the rate of 66.4 pounds per hour, and the gas was charged at the rate of 139 cu. ft. per hour to the gas preheater. The mol ratio of $S_2$ vapor to gas charged was 2.68. The run was conducted for a period of 12 hours during which period the average production of carbon disulfide was 27.5 pounds per hour, with a conversion of 89% of the theoretical amount of carbon disulfide based on the hydrocarbon gas charged.

In preparing the gas for the runs in Examples 1 and 2, No. 2 furnace oil was used in the feed preparation absorber; a 50–50 mixture of benzol and Stoddard solvent was used in the recovery system absorber; and No. 2 paraffin oil was used in the gas scrubber to remove sulfur from the reaction gases.

What is claimed:

1. A process for preparing carbon disulfide comprising preheating natural gas low in $C_3$ and heavier hydrocarbons to a temperature above the boiling point of sulfur but below reaction temperature, vaporizing sulfur, mixing vaporized sulfur with preheated gas in such proportions that sulfur is present in an amount of about 10% to 50% by weight in excess of the stoichiometric amount required to form carbon disulfide and hydrogen sulfide with said gas, heating the mixture to a temperature sufficiently above reaction temperature to give an average reaction temperature under adiabatic reaction conditions approximately equal to the desired reaction temperature, contacting the heated mixture in an adiabatic reaction zone with a catalyst selected from the group consisting of silica gel, activated alumina, synthetic silica-alumina catalysts, catalytic absorptive clays and bauxite at a temperature of approximately 1075° to 1175° F. for a period of time sufficient to produce a substantial amount of carbon disulfide, cooling the reaction products to a temperature above the melting point of sulfur but below the temperature of viscous sulfur, contacting the partially cooled reaction vapors with molten sulfur to remove sulfur from said vapors and recovering carbon disulfide from said vapors.

2. A process for preparing carbon disulfide comprising heating a mixture of sulfur vapor and hydrocarbon gas having a high methane content and a low content of $C_3$ and heavier hydrocarbons, in which mixture the sulfur content is about 10 to 50% by weight in excess of the stoichiometric amount required to form carbon disulfide and hydrogen sulfide, to a temperature sufficient to maintain the mixture at an average temperature of approximately 1075 to 1175° F. in an adiabatic reaction zone, contacting the heated mixture in an adiabatic reaction zone with a carbon disulfide-promoting catalyst for a period of time sufficient to produce a substantial amount of carbon disulfide and recovering carbon disulfide from the reaction products.

3. Process in accordance with claim 2 in which the mixture of sulfur vapor and hydrocarbon gas is heated to a temperature about 30 to 70° F. above the average reaction temperature to be maintained in the reaction zone.

4. Process in accordance with claim 2 in which the sulfur vapor-hydrocarbon gas mixture is charged to the reaction zone at a super-atmospheric pressure up to about 60 pounds per square inch.

5. Process in accordance with claim 2 in which the carbon disulfide-promoting catalyst is a substance from the group consisting of silica gel, activated alumina, synthetic silica-alumina, bauxite and catalytic adsorptive clays.

HILLIS O. FOLKINS.
CHARLES A. PORTER.
ELMER MILLER.
HARVEY HENNIG.

REFERENCES CITED

The following references are of record in the file of this patent:

UNITED STATES PATENTS

| Number | Name | Date |
|---|---|---|
| 1,735,409 | Pier | Nov. 12, 1929 |
| 2,187,393 | De Simo | Jan. 16, 1940 |
| 2,330,934 | Thacker | Oct. 5, 1943 |
| 2,386,202 | Fernelius et al. | Oct. 9, 1945 |
| 2,411,236 | Thacker | Nov. 19, 1946 |
| 2,450,658 | Hansford et al. | Oct. 5, 1948 |
| 2,450,687 | Rasmussen et al. | Oct. 5, 1948 |
| 2,474,067 | Preisman | June 21, 1949 |
| 2,487,039 | Belchetz | Nov. 8, 1949 |

FOREIGN PATENTS

| Number | Country | Date |
|---|---|---|
| 331,734 | Great Britain | July 10, 1930 |

OTHER REFERENCES

Mellor: "Comprehensive Treatise on Inorganic and Theoretical Chemistry," (1930), vol. 10, pages 43, 60, 98 and 99.